(12) United States Patent
Durham

(10) Patent No.: US 6,330,566 B1
(45) Date of Patent: Dec. 11, 2001

(54) APPARATUS AND METHOD FOR OPTIMIZING CLIENT-STATE DATA STORAGE

(75) Inventor: Peter Emmanuel Durham, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/102,518

(22) Filed: Jun. 22, 1998

(51) Int. Cl.$^7$ .................................................. G06F 17/00
(52) U.S. Cl. ............................ 707/104; 707/10; 709/203; 709/217
(58) Field of Search ................... 707/1–10, 100, 707/101, 102, 103, 104; 709/217, 218, 227, 229, 203; 713/201

(56) References Cited

U.S. PATENT DOCUMENTS

| | | |
|---|---|---|
| 5,740,252 | 4/1998 | Minor et al. |
| 5,761,662 | 6/1998 | Dasan . |
| 5,774,670 | 6/1998 | Montulli . |
| 5,787,254 * | 7/1998 | Maddalozzo, Jr. et al. ......... 709/228 |
| 5,796,952 * | 8/1998 | Davis et al. ........................ 709/224 |
| 5,819,284 | 10/1998 | Farber et al. . |
| 5,848,396 | 12/1998 | Gerace . |
| 5,862,325 * | 1/1999 | Reed et al. . |
| 5,953,406 * | 9/1999 | LaRue et al. ...................... 379/265 |
| 5,961,601 * | 10/1999 | Iyengar .............................. 709/229 |
| 5,961,606 * | 10/1999 | Talluri et al. ...................... 709/234 |
| 5,963,915 * | 10/1999 | Kirsch ................................. 705/26 |
| 5,983,227 | 11/1999 | Nazem et al. . |
| 5,991,713 * | 11/1999 | Unger et al. .......................... 704/9 |
| 5,991,878 * | 11/1999 | McDonough et al. ............... 713/200 |
| 6,006,260 * | 12/1999 | Barrick, Jr. et al. ................ 709/224 |
| 6,009,456 * | 12/1999 | Frew et al. .......................... 709/202 |
| 6,047,268 * | 4/2000 | Bartoli et al. ......................... 705/35 |
| 6,208,651 * | 3/2001 | Van Renesse et al. .............. 370/392 |

OTHER PUBLICATIONS

Thomas, Brian "Recipe for E–Commerce", IEEE Internet Computing, Nov.–Dec. 1997.*

Netscape Communications, "Persistent Client State HTTP Cookies", 1995.

Kristol et al., "RFC2109 HTTP State Management Mechanism", Feb. 1997. Netscape Communications.

St. Laurent, Simon, "Cookies", Chapter 10, "Entering the Danger Zone: State Management with Microsoft Site Server", pp. 303–333, 1$^{st}$ Edition, New York, McGraw–Hill, 1998.

Microsoft Normandy, "Internet Personalization System," Operations Guide, Version 1.1, Beta Release 2, Sep. 1996.

* cited by examiner

*Primary Examiner*—Thomas Black
*Assistant Examiner*—Uyen Le
(74) *Attorney, Agent, or Firm*—Klarquist Sparkman LLP

(57) ABSTRACT

A system and method for reducing browser latency in customized web page production through caching in one or more client-stored tokens a compressed representation of a core set of user information preferences. Compression can be achieved in part by using bit flags to represent preference elections, where default preferences can be omitted to reduce token size. Multiple compressible regions may also be incorporated into a token so that mutually exclusive preferences can be stored in different regions, increasing the likelihood of compressed regions. To further reduce token size, multiple bit flags can be treated as defining a single character within the token. Thus, preferences may include stock selections, weather, news, sports, or other interests, where each preference is assigned a bit position in a series, and the series then interpreted as one or more characters.

8 Claims, 6 Drawing Sheets

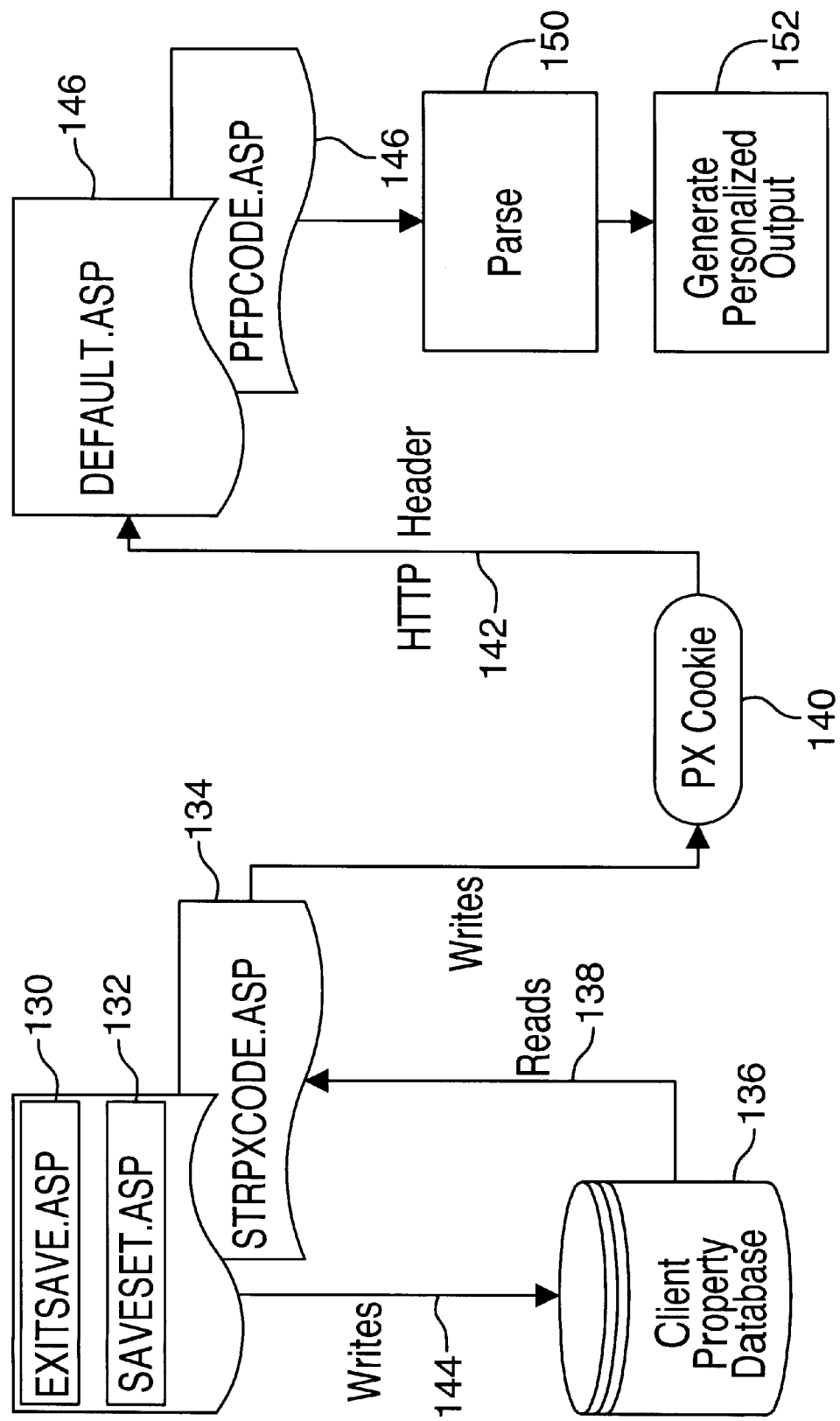

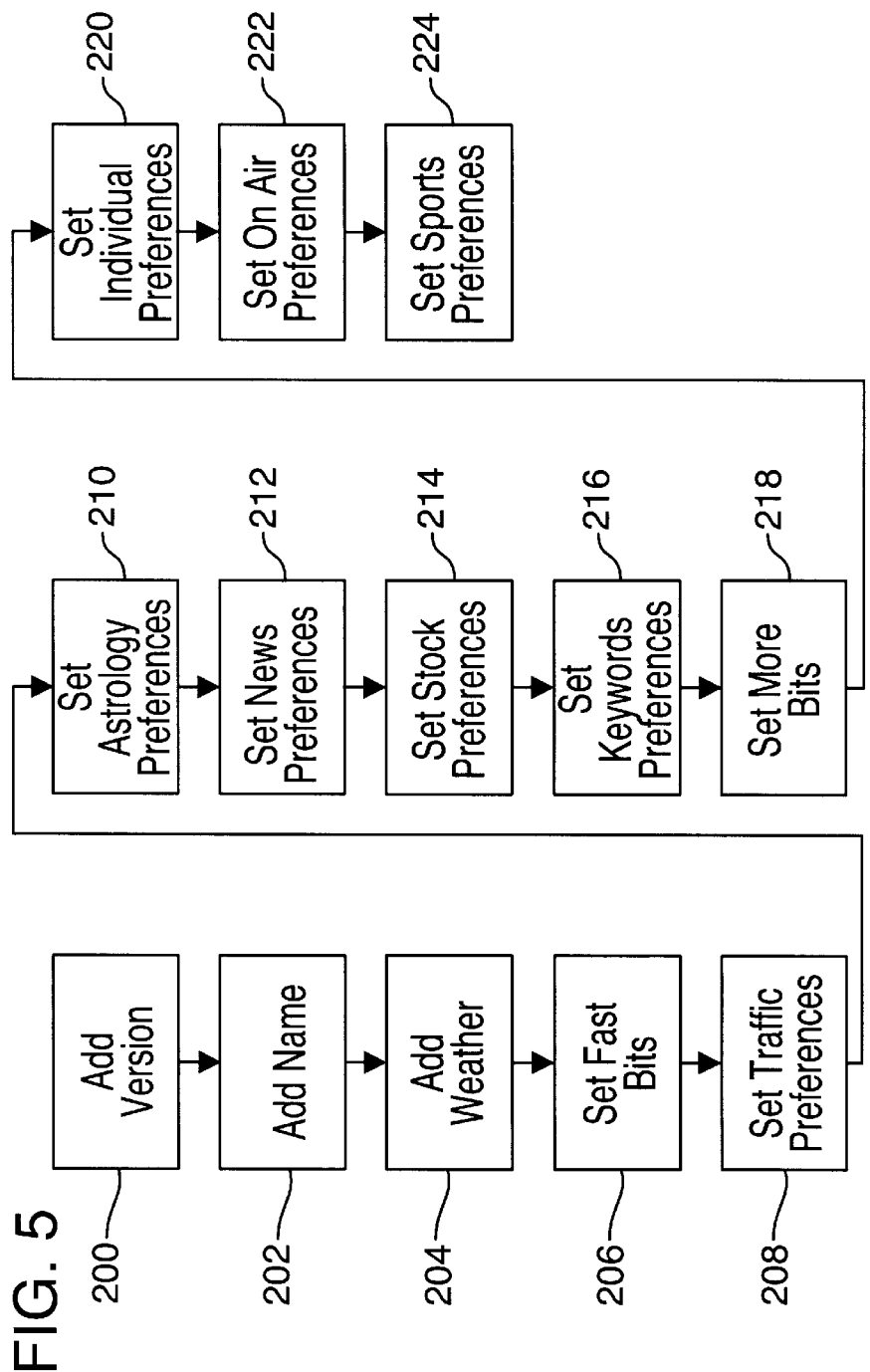

FIG. 7

Personal Front ▷ Personalize This Page  WSJ.com

Weather

Seattle, WA  Updated 00:00 ET May 14, 1998 current conditions:

| | | | | | |
|---|---|---|---|---|---|
| Wind | s6 | Barometer | 29.66" | Humidity | 83% |
| Wind chill | 51° | UV Index | 4 | Visibility | 10 miles |

54° cloudy 4 day forecast:

| | WED | THU | FRI | SAT |
|---|---|---|---|---|
| | | | RAIN | RAIN |
| HIGH | 65° | 58° | 58° | 68° |
| LOW | 48° | 45° | 46° | 45° |

Click to go to one of the following views: • Radar • Satellite • Precipitation

Weather provided by intellicast

News

U.S. News
- Missle defense system fails fifth test
- Police battle auto air bag thefts
- More than 150 Haitians jump ship
- GOP survey sees tobacco weakness
- Half of inspected 737s need work 258, 270, 272, 274

APPARATUS AND METHOD FOR OPTIMIZING CLIENT-STATE DATA STORAGE

COPYRIGHT AUTHORIZATION

The appendix to this disclosure contains copyrighted material. The copyright owner has no objection to the facsimile reproduction by anyone of the patent document or the patent disclosure, as it appears in the Patent and Trademark Office patent file or records, but otherwise reserves all copyright rights.

FIELD OF THE INVENTION

The present invention relates to caching client information in tokens stored on a client computer, and is illustrated with reference to storing web page customization data.

BACKGROUND AND SUMMARY OF THE INVENTION

In 1989, the Counseil Europeen pour la Recherche Nucleaire (CERN) started the Internet revolution with the creation of a hypertext system to allow CERN nuclear physicists to easily transfer documents containing both pictorial and textual data. One of CERN's primary goals was to unify existing data transfer protocols under a consistent interface for accessing different document types across diverse network mediums. In 1991, CERN publicly released their hypertext system, and after another year of review and improvement, in 1993 nascent Internet browsers were developed. These browsers brought Internet connectivity to the general public, and ever since there has been a near exponential explosion of software and hardware development to provide all manner of browser-based data transfer.

Fundamental to the operation of browsers is that they (as do all World-Wide-Web applications) operate on a discrete client-server basis. A client, such as a web browser, sends a request to a server, such as a Hypertext Transfer Protocol (HTTP) based web server, and the server responds to the client's request. The system is discrete in that a stateless protocol is used. Instead of opening and maintaining a connection to the server, the client instead encapsulates all relevant data into the request, a connection is opened to the server, the request is sent, and the connection is closed. Similarly, in response to the request, the server opens a connection to the client, transfers the results of the request, and closes the connection again. The nature of discrete requests and responses allows for efficient data transfer, and efficient multiplexing of multiple client requests.

But the efficiency advantages of this stateless system quickly turned into a disadvantage for developers wishing to provide more capabilities, such as sending custom web pages to web browsers. It is advantageous to allow a server to send customized web pages in response to a client browser's connection, but this is difficult with a stateless protocol. Various methods have been developed to simulate a statefull process over a stateless connection.

One such method is to require the client to log in, allowing the server to lookup the client in a server database. Then each web page sent to the client is formatted on the fly to include hypertext links including an identifier indicating who is contacting the server. When the client selects a link, the server receives a request with embedded information identifying the client, allowing the server to track the client's actions.

But, it is inconvenient to require a client to log in each time. An alternative solution is to have the client retain an updateable token that can be associated with a server's network location (e.g., a web site), so that the token can be transmitted in lieu of multiple login requirements. This token is commonly referred to as a "cookie," and it can be passed between a client and server to allow server tracking of client activity.

A cookie is small, having a maximum size of about 4K. Cookies are designed to be transparently placed and retrieved from a client computer. In the context of a browser, every time a client contacts a particular network address, the client browser automatically transmits any cookies related to that network address. When sending a response to a contacting client, the server can update or set new cookies to be maintained by the client. This allows the server to track client activity.

Unfortunately, cookie usage suffers from several significant drawbacks. One such drawback is that cookies are limited in size, and only a limited number of cookies can be associated with any given network address; thus, there is a small finite limit on state information that the client can retain. Another drawback is that all cookie data is transferred to a server, even when irrelevant to a particular client transaction. This is due to a cookie transmission being based on the address contacted; for any given address, all client cookies related to that address are automatically sent to the server. This gives rise to significant unnecessary overhead. For example, if a server sets 20 cookies, each 4K in size, a client faces an 80K overhead in every communication with the server; this is compounded by a likely 80K overhead in any responses from the server, since if the client is maintaining its state in cookies, an updated-cookie will be sent by the server.

Although limited storage can be overcome by increasing cookie size, client-server communications would suffer an even greater transaction cost. Here, the term "cost" is used to generally express the time and data required to track client-server interaction-states. High cost is synonymous with having high overhead in communicating with a server. Such overhead is disadvantageous when clients communicate over saturated links.

To avoid the overhead of large cookie transmissions, an alternative approach is to have a server generate a unique (preferably short) client identifier, and to embed this id in a cookie set in a response to an initial contact by a client with the server. On subsequent client contact, the server receives the cookie with embedded id, allowing the server look up the client in a local clients database. As with the previous configuration, each client HTTP request to the server includes the client's relevant cookies, but the overhead is greatly diminished since only an id is transmitted, rather than the client's entire state information. Thus, the server can track what the client has been doing.

A problem with this method, however, is now the server is entirely responsible for tracking the client's state. This may appear a relatively minor burden since database technologies afford rapid access to client data. But, since network connections allow multiple clients to simultaneously contact a server, the server can be quickly overwhelmed with service requests.

(Further information about Internet cookies can be found in *HTML & CGI Unleashed*, Sams.Net Publ. (1995); *Dynamic HTML Unleashed*, Sams.Net Publ. (1998); as well as at Internet site http://developer.netscape.com/library/documentation/-communicator/jsguide4/cookies.htm, and http://developer. netscape.com-/news/viewsource/archive/goodman_cookies.html.)

Thus, none of the prior solutions is particularly advantageous since they either entrust all state-tracking responsibility to resource-limited client storage, or to a possibly-overwhelmed server.

In accordance with an embodiment of the present invention, the foregoing drawbacks are overcome by caching in a client-stored cookie a globally unique client id (GUID) along with a core set of user data (such as preferences) generally applicable to the user's interaction with a server. To reduce overhead in transferring the cookie, preferences can be combined and compressed. By storing the unique id, a server is able to look up and track all of the client's data in a local database, and can retrieve data specific to a particular client request. And, by storing core data, such as page formatting and content preferences (hereafter "personalization settings"), the server can tailor the client's experience without having to incur the cost of database look-ups. Additionally, a cookie-version number can be embedded to indicate how a server should interpret an incoming cookie. These features improves site performance and stability.

In such an embodiment, when a client visits a front (entry) page of a site, entry code on that page checks whether the client's connection software (e.g., a web browser) provided a cookie containing the client's personalization settings. If the cookie was not automatically provided to the server (or the version number is too old), but the user has been assigned a GUID, the entry code calls a generation routine to generate a cookie. Note that if there are no cookies, browser serial number, or other identifier for the client, the client may be prompted to enter identification information in one or more dialog boxes. (It is understood that references to calling a routine includes any method of generating such a cookie, such as by a procedure, function, ASP file, Active X control, D/COM, Java, J/Script, D/HTML, plug-in, etc.) The generation routine is used to retrieve the relevant set of personalization settings from the database, build the compressed cookie, and pass it to the user's browser. Similarly, when the user completes a personalization session, or if the server wants to update the client state, a save settings routine is activated to update the client cookie.

If the client does not yet have any personalization settings, a cookie is created with value "0" (or some other value indicating an empty cookie). The server can then immediately redirect the client to a personalization routine so that a non-empty cookie may be defined, or personalization can be deferred. If deferred, on subsequent contact with the server the empty cookie will be transferred, indicating to the server that it needs to personalize the new client.

If the client does have personalization settings stored in a server database, a compressed cookie can be created by retrieving the core settings and setting them into a cookie for storage by the client.

A cookie can be formatted as a string containing multiple substrings, each delimited by a separation character (e.g., a "!" or other character). These substrings can contain data in different formats, such as simple strings, comma-delimited string lists, compact Boolean arrays, and encoded numeric arrays. Formatting choices are made to minimize data size, as well as to minimize data decoding time on the server. In some cases, this means the code stores data in non-canonical formats. ("Decoding time" refers to the time necessary to decompress stored data.)

For example, an entry page may be personalized to display a user's name. This data can be stored in a cookie as [First Name]{[space][Last Name]}[possessive suffix] (e.g., "John Doe's"). Therefore, the work to determine whether there is a last name, and what possessive suffix to use, is only done once at cookie creation time. (Note that although plain-text is shown in this example, the text representation can be compression-encoded into a shorter (but unreadable) ASCII sequence.) Similarly, a web page may provide other information (e.g., stocks, news, sports, etc.) that the client has requested be displayed on entry to the page. Preferences, such as which stocks to display, can be stored as a comma-delimited list, or in some other format for direct submission to a third-party information-retrieval system.

To reduce cookie size, a cookie creation routine encodes numeric data in the range 0–63 as a single character, the ASCII character corresponding to N+48. Base64 or other schemes can also be used to encode numeric data. However, N+48 is preferable because it can be quickly encoded and decoded, and it is not necessary to protect it against character transformation (i.e., the characters are interpreted on the same kind of system that generated them).

Cookie size is further optimized by representing configuration information as a compressed series of Boolean (yes/no) values. For example, one could use a single bit to track whether a client prefers to receive news listings at the top or the bottom of a personalized page. Other personalization choices can be concatenated into a long bit sequence, and the entire sequence then compressed. First, collections of Boolean values are grouped into 6-bit runs and then N+64 encoded. For example, (True, True, False, False, True, True) is mapped to 110011, which is $51_{10}$. 51+48=99, which corresponds to the ASCII character 'c'. Storing Boolean information in this manner is significantly more compact than storing strings such as "Sports=on" or by storing a Boolean string-array "110011".

A further optimization is to truncate superfluous delimiters corresponding to empty values. Thus, rather than creating a cookie containing "05!John Doe's!sea!01000!!KING!!!00000!00000!00000!*!*!*!*!*", instead only "05!John Doe's!sea!01!!KING" is stored. Such a reduction is possible when the cookie interpretation code assumes default values for unspecified information. Note that the leading "05" corresponds to version control. The cookie creation routine adds a version number to the beginning of the cookie, so that the cookie interpretation code can determine what format the cookie is in. This allows the server to utilize different format/compression schemes depending on the types of data the server expects to present to the client.

Other features and advantages of the invention will be apparent from the detailed description and accompanying drawings.

BRIEF DESCRIPTION OF THE DRAWINGS

FIG. 3 illustrates the data flow between a client contacting a server.

FIG. 4 shows an exemplary cookie having compressed and uncompressed fields.

FIG. 5 is a flowchart of steps required to generate the FIG. 4 cookie.

FIG. 7 shows a second exemplary personalized page.

DETAILED DESCRIPTION OF ILLUSTRATED EMBODIMENTS

Prior art systems either store all client configuration information on a client, or they store all information in a server database. Storing all data on the client results in large amounts of data being unnecessarily sent to a server, as the client needs to pass along its state with each communication to the server. The alternative is to store a client identifier on the client, and to use it as a database retrieval key. Unfortunately, this server-based storage subjects page generation speeds to the vagaries of database retrieval speeds. The present embodiment combines the best of both methods to avoid long transmission times of state information, as well as long database retrieval times, and provides further enhancement. Frequently used data is cached in a client cookie in a compressed format, while all client data is stored in a server database.

The invention has been incorporated into the MSNBC web site marketed by Microsoft Corporation of Redmond, Washington, and is designed to work in tandem with Internet browsing software. Briefly described, Internet browsing protocols (e.g., the Hypertext Markup Language (HTML)) are stateless, and the invention provides compressed tokens ("cookies") which are used to track client state information over stateless protocols.

Using compressed cookies allows client preferences to be compactly stored in a cookie so that an HTTP web page may be quickly presented in a custom format to the client, without the overhead of having to retrieve all client preferences from a server database. Local storage of preferences allows compiled-type programs (ActiveX, Java, etc.) to immediately arrange the client's viewing environment (window locations, introductory music/video, etc.) according to locally-stored preferences and configuration data, while simultaneously seeking a connection to the server. Thus a client will not have completely inactive sessions while awaiting server access.

EXEMPLARY OPERATING ENVIRONMENT

Figure 1:
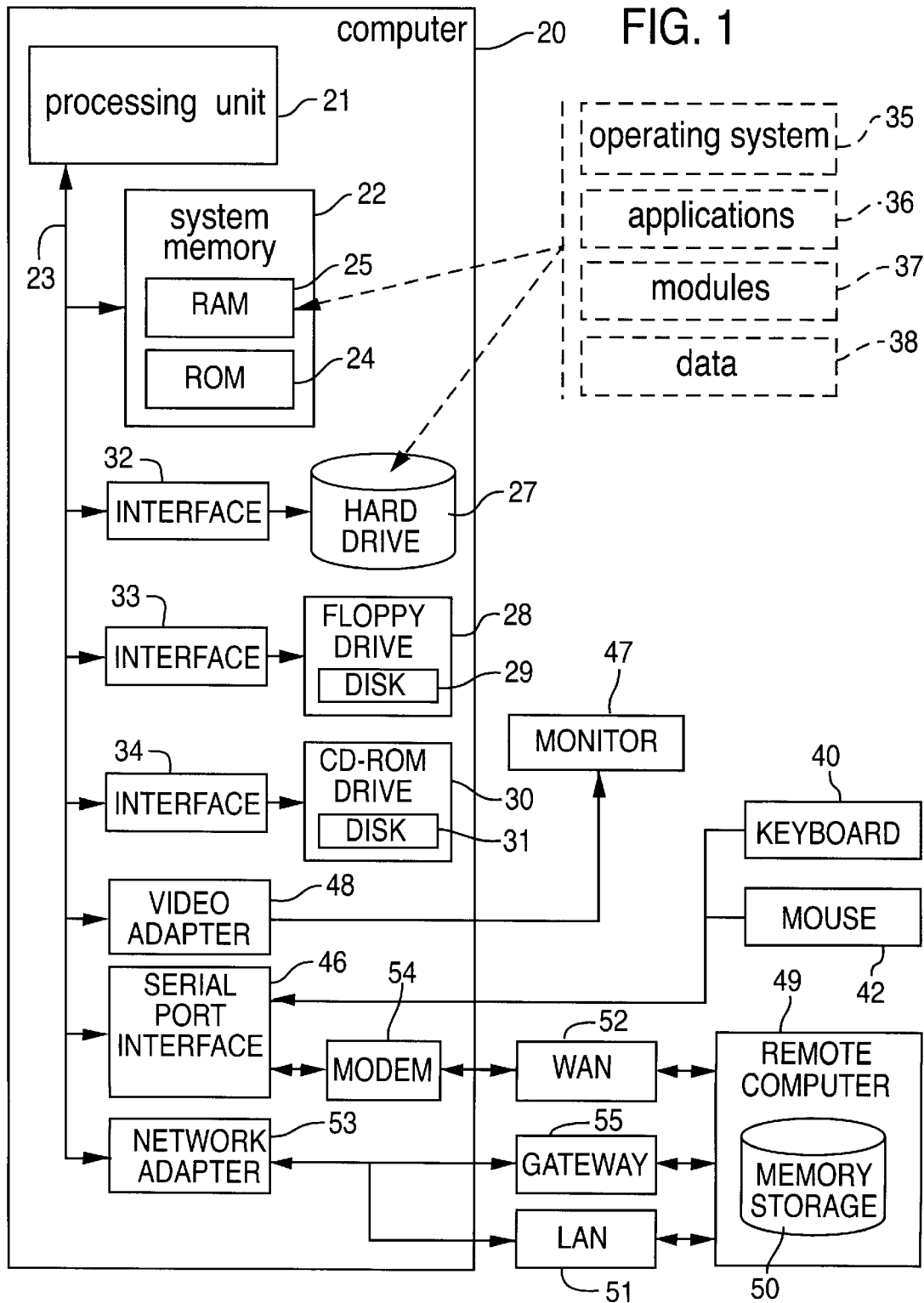
FIG. 1 is a block diagram of a computer system that may be used to implement a method and apparatus for manipulating compressed cookies.

FIG. 1 and the following discussion are intended to provide a brief, general description of a suitable computing environment in which the invention may be implemented. While the invention will be described in the general context of computer-executable instructions of a computer program that runs on a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The illustrated embodiment of the invention also is practiced in distributed computing environments where tasks are performed by remote processing devices that are linked through a communications network. But, some embodiments of the invention can be practiced on stand alone computers. In a distributed computing environment, program modules may be located in both local and remote memory storage devices.

With reference to FIG. 1, an exemplary system for implementing the invention includes a computer 20, including a processing unit 21, a system memory 22, and a system bus 23 that couples various system components including the system memory to the processing unit 21. The processing unit may be any of various commercially available processors, including Intel x86, Pentium and compatible microprocessors from Intel and others, the Alpha processor by Digital, and the PowerPC from IBM and Motorola. Dual microprocessors and other multi-processor architectures also can be used as the processing unit 21.

The system bus may be any of several types of bus structure including a memory bus or memory controller, a peripheral bus, and a local bus using any of a variety of conventional bus architectures such as PCI, AGP, VESA, Microchannel, ISA and EISA, to name a few. The system memory includes read only memory (ROM) 24 and random access memory (RAM) 25. A basic input/output system (BIOS), containing the basic routines that help to transfer information between elements within the computer 20, such as during start-up, is stored in ROM 24.

The computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of data, data structures, computer-executable instructions, etc. for the computer 20. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs (e.g., Internet browser software) 36, other program modules 37, and program data 38.

A user may enter commands and information into the computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices (not shown), such as speakers and printers.

The computer 20 is expected to operate in a networked environment using logical connections to one or more remote computers, such as a remote computer 49. The remote computer 49 may be a web server, a router, a peer device or other common network node, and typically includes many or all of the elements described relative to the computer 20, although only a memory storage device 50 has been illustrated in FIG. 1. The computer 20 can contact the remote computer 49 over an Internet connection established through a Gateway 55 (e.g., a router, dedicated-line, or other network link), a modem 54 link, or by an intra-office local area network (LAN) 51 or wide area network (WAN) 52. It will be appreciated that the network connections shown are exemplary and other means of establishing a communications link between the computers may be used.

In accordance with the practices of persons skilled in the art of computer programming, the present invention is described below with reference to acts and symbolic representations of operations that are performed by the computer 20, unless indicated otherwise. Such acts and operations are sometimes referred to as being computer-executed. It will be appreciated that the acts and symbolically represented operations include the manipulation by the processing unit 21 of electrical signals representing data bits which causes a resulting transformation or reduction of the electrical signal representation, and the maintenance of data bits at memory locations in the memory system (including the system memory 22, hard drive 27, floppy disks 29, and CD-ROM 31) to thereby reconfigure or otherwise alter the computer system's operation, as well as other processing of signals. The memory locations where data bits are maintained are physical locations that have particular electrical, magnetic, or optical properties corresponding to the data bits.

Figure 2:
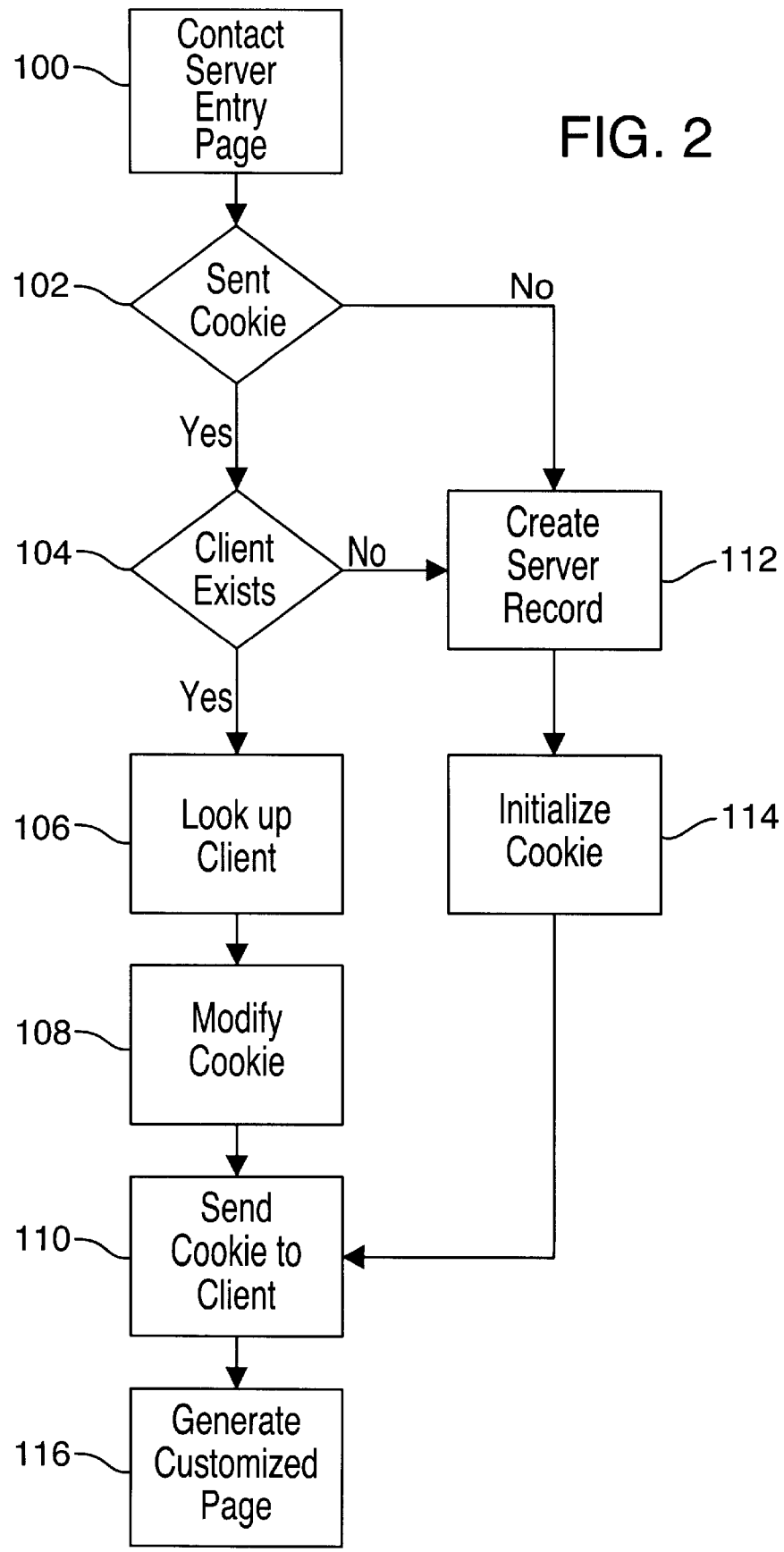
FIG. 2 is a flowchart showing the user personalization process.

FIG. 2 shows the user personalization process, or preference election process, that results in generating a compressed cookie. The illustrated personalization process corresponds to an initial contact by a client with a server, such that the server needs to generate client personalization data which will be remembered and used to generated web pages in accord with the client's indicated interests.

While a database will likely remain a primary repository of user settings, the compressed cookie caches settings required to build a personalized front page. FIG. 2 corresponds to the process for creating the compressed cookie, and shows the flow of data related to the cookie through the personalization processes. This cookie creation process is dependent on the settings written to the user property database by the Active Server Page (ASP) code in supporting ASP functions EXITSAVE and SAVESET (see FIG. 5 discussion). ASP functions are used to allow server-side data processing. Generally, ASP pages contain a combination of HTML, server-side scripting languages (i.e. VBScript, JScript, REXX, or Python), and server-side components (i.e. Collaboration Data Objects (CDO) or databases). ASP code is interpreted on a server, and the results sent to a client; this allows the processing steps to be hidden from the client. Output to the client can be HTML, a revised ASP page for interpretation by a client browser, or some other format. ASP pages can also be embedded into ActiveX (or other) objects, providing further abstraction (and hiding) of server processing activity.

Note however, that Internet client software usually allows a client to automatically reject cookies; for the purposes of the discussion herein, it is assumed that ASP pages can not or do not override a browser's refusal to accept cookies, and therefore a client's browser is configured to accept such cookies. Also note, however, that a browser serial number embedded within each browser can be used to supplant portions of a cookie in the advent that cookies are being rejected or accidentally deleted. Additionally, the server could store a copy of the client's current cookie definition, and use the serial number to retrieve the cookie if it was accidentally deleted; thus avoiding the client having to re-initialize (re-elect) preferences.

As shown, initially a client contacts 100 a server with Internet client software. A first test 102 is made to determine whether the client automatically sent the server a client cookie. If so, the server verifies that the client exists 104 in a local clients-database, and retrieves 106 configuration information about the client. The server can also modify 106 the client's cookie before sending 110 it back to the client in an HTTP response from the server.

If, however, the initial tests 102, 104 fail, indicating the client did not initially send a cookie, or that the client was not found in the client database (for example, the cookie may have been corrupted by cookie management software), then a new database record is created 112 for the client, and a new cookie initialized (generated) 114. This cookie is then sent 110 to the client so that a personalized page can be generated 116 for the client.

Note that there can be a case where the client sent in enough data to allow the server to recognize the client, but that the cookie contents were otherwise incomplete or damaged. Under such a circumstance, cookie generation can simply become a matter of retrieving client data from the server database and generating a cookie from that data.

FIG. 3 shows the overall relationship between client and server. Not shown is the client's Internet browser (or equivalent) software that is requesting the DEFAULT.ASP web page from the server. Shown are two ASP scripts 130, 132 which are involved in compressed cookie creation and interpretation. STRPXCODE.ASP 134 is included within both ASP files, and contains support code to create and manipulate compressed cookies. When a client requests the entry page (DEFAULT.ASP 146) and does not have a compressed cookie, a Property Database 136 is queried to see whether the user has personalized. If they have, then StrPxFromPropertyDatabase (a support routine to retrieve database information) is called to create the cookie; this routine takes the Property Database object 136 as an optional parameter (if one is not provided, a new database is created). StrPxFromPropertyDatabase retrieves 138 client preferences from the client property database, assembles the cookie 140, and then adds it to an outgoing HTTP header 142 through a Response.Cookie (set cookie) mechanism. Since the cookie value will be moderately large (typically 80–100 characters), preferably its path is set so it is only sent from the client when pulling the personalized front page (DEFAULT.ASP 146), and not on any other HTTP request. However, reducing the number of times the cookie is sent by the client needs to be balanced against unnecessary cookie proliferation.

During the preference selection process, client preferences are also recorded 144 in the Property Database 136. Consequently, the code that sets the cookie based on first-time interaction with the client, can also to handle setting the cookie after an update-personalization session. In particular, when a client has no cached-settings cookie, but does have a database entry, StrPxFromPropertyDatabase generates a cookie based on Property Database 136 settings. When the client changes a setting on the site, the Property Database is updated, and then StrPxFromPropertyDatabase updates the cookie. And, if the cookie is strategically pathed, it may be seen by related sites. Thus, on visiting a related site, the cookie could be inspected, possibly updated (e.g., the version is old), while also allowing the related site to create its own cookie based in part on the cookie from the related site.

PFPCODE.ASP 146, included in the DEFAULT.ASP 148 file, contains client-side code for interpreting the compressed cookie. PFPCODE.ASP parses the cookie contents 150 and generates 152 a personalized page from the cookie values. DEFAULT.ASP then uses the passed cookie to construct the personalized page. Preferably, when it is known that the page to display is complex, buffering is turned off so that the client sees partial page-loading; this increases the apparent speed of the system by allowing a personalized page to be viewable while loading.

When a server buffers output, the server is assembling data in server memory, and then transmitting the web page when it is complete. An advantage to such buffering is that server-side code, such as an ASP file, can modify generated data (such as revising an HTTP header) based on the content of the generated data (since nothing has yet been transmitted). The disadvantage to this arrangement is that no data is being transmitted to the client until the entire page is completed. Turning off buffering for complex pages (i.e. pages which may take extended periods of time to generate) results in content being sent to the client as soon as it is generated, thereby giving the appearance of speedier access to a server that is otherwise busy completing the generation of the requested data.

Note that in order for the compressed cookie process to work properly, it is necessary that the client support cookies. If the client does not support cookies, then personalization is not possible. However, this system can be mimicked if the client software has a readable serial number or other unique identification. If a serial number is available, it can be used to retrieve a cookie from a server database and presented to DEFAULT.ASP for generating a personalized page. In addition, the serial number may be embedded in all links, buttons, etc. of dynamically generated pages, allowing an alternative to requiring cookies.

Also, if a compressed cookie appears to be invalid (see FIG. 2, step 104), one can walk through the Step-by-step personalization process to evaluate where an error in the cookie resides.

FIGS. 4 and 5 illustrate cookie creation. FIG. 4 shows an exemplary cookie having reference numbers identifying portions of a cookie generated by correspondingly numbered steps in FIG. 5. An interface (via a web page form, menu, control, etc.), not shown, presents exemplary preference choices, and the client elects particular preferences which are then forwarded to the server. These preferences are stored in a database, as well as encoded into a cookie. It is understood that the following preferences are exemplary, and that other preferences may presented and tracked. The interface is presented to the client after the client's initial contact with the server entry page reveals the client is a new client. It is assumed that the entry page is ASP based, but other equivalent formats are possible. It should also be noted that some implementations of the FIG. 4 cookie may require the cookie to contain control code sequences rather than certain characters in the sequence. For example, the space in John Smith's name may be encoded as the HTTP control " ", or the "!" delimiters may instead be represented by a numeric index into a character set.

It is presumed in the following discussion that a generated web page has the following sections: general entry page information, News (local and traffic, national, international, Meeks column, Moran column), Commerce (Bowermaster column, Byron column, Crockett column, Huus column, Thomas column, Weaver column), Sports, Technology (Internet; Tech Policy; Tools, Toys and Talk; Crimes, Errors, and Annoyances) Living (Healthy Adam, Healthy Eve, Movie Reviews, Celebrity Bar), Opinions, Chat, On Air, and Personal Topics. It will be understood by those skilled in the art that these page sections are merely exemplary, and that sections may be added or removed according to the type of page being developed.

The overall process is that (assuming a client did not send a proper cookie on contacting the server) the client is redirected to an initialization page to start entering the client's personalization preferences (FIG. 2, step 114). When personalization completes, the settings are written to a server user-property database. The settings are read back by a cookie generation subroutine and used to generate the compressed cookie. The compressed cookie is included in a response-page header when an HTTP response is generated to the initial client contact request is made for the entry page. Code within the response page (an ASP file) disassembles the cookie and uses its contents to generate the page according to user preferences stored in the cookie.

Thus, at step 200 of FIG. 5 a version number is added to the cookie. Tracking a version number allows the system to know when the client has become out of date, and it also allows the system to know what cookie-format to expect when processing a pre-existing cookie.

At step 202 a cover name is added to the cookie. This name represents what the client desires to be called at the top (or some other location) of generated web pages. These cover names consist of the client's name in proper possessive form. That is, by default a client named Bob Smith will get a cover name of "Bob Smith's", and a client named "Bob Jones" will get a cover name of "Bob Jones'". This allows a page title of "Bob Smith's Web Page" or "Bob Jones' Stock Quotes" to be easily generated. This also highlights a general design goal of the invention, in that as much processing as possible is front-loaded in the initial construction of the cookie. Information such as proper possessive form, which is likely relevant knowledge for multiple web pages, is determined at cookie creation time. This avoids having to make this determination at a later time, and increases the apparent responsiveness of dynamic web page creation.

At step 204, weather selections are added to the cookie. Preferably the user interface (e.g., a web page) is presented to the client, allowing the client to select from a list of possible weather locations. This field, if defined, contains at least a 3-character name for the client's preferred weather location. Weather information from this city is presented in a personalized web page according to indicated preference. That is, the client is allowed to select where on the page the weather display should be, and this selection is recorded in the cookie, as well as stored in the client's database record. (All client data is stored in the database, allowing a cookie to be entirely reconstructed if necessary.)

At step 206, Fast Bits are set. The Fast Bits contain a compressed array of Boolean values, corresponding to the "on/off" properties selected by the client in the preferences election stage. For the purposes of this description, the bits are presumed broken into two regions, the second region referenced herein as More Bits. The advantage to multiple bit regions is that, as described below, trailing 0's are truncated. Thus, a region of all zeros is an empty region, requiring no storage space within the cookie (except for region boundary markers). Multiple regions provide more opportunity to truncate a particular region, and the number of such regions necessarily depends on the data arrangement chosen by the web site designer.

A cookie is defined to have a restricted character set; consequently at the present time only 6 bits are required to encode all possible cookie character values. Consequently, a preferred bit packing scheme is to take 6 bits out of a bit region, and to interpret those bits as a binary representation of a character within the cookie character set. It is understood that this packing scheme is extensible to an n-bit representation if at some future time the character set is expanded. The character stored is the ASCII character 48 (which is the zero character) plus the 6-bit number. This configuration allows storing all possible printable values, while also mapping empty bit ranges to the "0" character. To further compress cookie entries, trailing 0's are truncated, as it is understood that a missing value represents 0, which is 6 consecutive off values.

In a claimed embodiment of the invention, each bit sequence is thirty bits long. The five-character Fast Bits 206 correspond to the following preferences:

| Bit Number | Value/Meaning |
|---|---|
| 1 | Show 4-day weather forecast on entry page; |
| 2 | Show available News section on entry page; |
| 3 | Show available Commerce section on entry page; |
| 4 | Show available content in Sports section on entry page; |
| 5 | Show available news and traffic content in Local News section on entry page; |
| 6 | Show available content in Technology section on entry page; |
| 7 | Show available content in Living section on entry page; |
| 8 | Show available content in Opinions section on entry page; |
| 9 | Show available news Chat schedule on entry page; |
| 10 | Show available content in On Air section on entry page; |
| 11 | Show available keywords content in Personal Topics section on entry page; |
| 12 | Show available International News in News section; |
| 13 | Show available U.S. News in News section; |
| 14 | Show Meeks column in News section; |
| 15 | Show Moran column in News section; |
| 16 | Show Bowermaster column in Commerce section; |
| 17 | Show Byron column in Commerce section; |
| 18 | Show Crockett column in Commerce section; |
| 19 | Show Huus column in Commerce section; |
| 20 | Show Thomas column in Commerce section; |
| 21 | Show Weaver column in Commerce section; |
| 22 | Show headlines from local affiliate in Local News section; |
| 23 | Show The Internet in Technology section; |
| 24 | Show available Tech Policy content in Technology section; |
| 25 | Show available content from Tools, Toys, and Talk in Technology section; |
| 26 | Show available content from Crimes, Errors, and Annoyances in Technology section; |
| 27 | Show available content from Healthy Adam in Living section; |
| 28 | Show available content from Healthy Eve in Living section; |
| 29 | Show available content from Movie Reviews in Living section; and |
| 30 | Show available content from Celebrity Bar in Living section. |

As a compression optimization, empty preferences are truncated to reduce unnecessary overhead. If it turns out that the last 12 bits are 0, then the two characters corresponding to those bits are not stored in the cookie. With careful planning, such as by locating common preferences early in the bit sequence, and by placing mutually exclusive options in different 6 bit runs, significant storage savings can result.

At step 208, traffic preferences are set. Traffic is shown in the Local News section. The currently possible values are 0=do not present traffic information, 1=Atlanta, 2=Boston, 3=Chicago, 4=Cincinnati, 5=Houston, 6=Los Angeles, 7=Minneapolis/St. Paul, 8=Paris, France, 9=Philadelphia, 10=Phoenix, 11=Pittsburgh, 12=San Antonio, 13=San Diego, 14=Seattle, and 15=Washington, D.C. Other traffic locations can be designed. Although this discussion may speak to assigning numeric values to preferences, it is understood that the numeric values may be encoded to reduce storage space. That is, a single character from the available character set can be used as an index into a table of preference values. For example, using a N+48 mapping (see Background and Summary), "10=Phoenix" becomes a ":", "11=Pittsburg" becomes ";", "12=San Antonio" becomes "<", etc.

At step 210, astrological preferences are set. Horoscopes are shown in the Living section. The available signs are 0=do not present astrological information, 1=Aries, 2=Taurus, 3=Gemini, 4=Cancer, 5=Leo, 6=Virgo, 7=Libra, 8=Scorpio, 9=Sagittarius, 10=Capricorn, 11=Aquarius, 12=Pisces. Future embodiments may also add entries for astrological related matters. (As with step 208, and other steps, the values can be encoded into a single character.)

At step 212, Local News affiliates (FCC) are selected. Preferably the field is encoded with the FCC ID of preferred local news affiliates. This information is only included in the cookie if the client has chosen to have local news on their personalized front page.

At step 214, stock and index symbols are selected. In this step, the client can directly enter a list of stock symbols into an appropriate field, or the client may be presented with a list of all possible stock symbols to choose from, or the client may receive a page showing popular stocks and be provided opportunity to lookup or search for other symbols. This field of the cookie contains a comma-delimited list of the user's preferred stock symbols and index choices. Index choices are added as symbols to the list just like stocks. The available selection of stock and index symbols is generated from available local and third-party resources (e.g. the DOW, SP500, NASDAQ, AMEX, and RUS2000).

To increase the efficiency of dynamically adding stock symbols to a generated page, the format of the stock listing is stored in a format suitable for direct sending of the field to a quoting service without (significant) manipulation during generation of the page. When generating the client's page, the cookie field is sent to a quoting service as a query, and the results placed into the generated page. To reduce overhead, however, a selection of the most commonly inspected symbols are cached in a memory of the server. The cached information is used before retrieving data from the quoting service.

Alternatively, to avoid the overhead of dynamically retrieving data from the quoting service, the server instead could maintain a periodically updated cache of all stock values, from which the client directly retrieves information. This configuration would also allow the client to obtain data when the quoting service is temporarily offline. Such local data could be presented as stale data, if it is more than some time period old (say 15 minutes), and updates are not available. Server caching can also be used for other data requiring third party (or slow database, e.g., SQL) retrieval, such as real-time information for ticker headlines, weather data, sports scores, chat schedules, On Air schedules, local headlines, and astrology information.

At step 216, user Keywords are identified and stored. This field contains a comma-delimited list of the user's personal keywords. These keywords are client selected and can be used to search local or third-party resources to find particular topics of interest to the client. If defined, bit 11 of the Fast Bits is set to on, and personal topics included in the entry page.

At step 218, a second compressed array (More Bits) of Boolean values are determined. As with the Fast Bits, the More Bits contains 30 bits represented by 5 characters. As discussed above, different bit fields, and the regions within the fields, are preferably arranged to maximize opportunity to truncate field contents. In the exemplary embodiments, for example, user preferences have been divided into "Quick Setup" features (stored in the Fast Bits array), and other preferences which are stored in the More Bits array. If a user only performs a quick setup of user preferences, much or all of the More Bits will remain 0 (empty). The bits in this field correspond to the following properties:

| Bit Number | Value/Meaning |
|---|---|
| 1 | Show Borges column in Sports section; |
| 2 | Show Gargano column in Sports section; |
| 3 | Show Hyde column in Sports section; |
| 4 | Show Ingram column in Sports section; |
| 5 | Show Kravitz column in Sports section; |
| 6 | Show Lupica column in Sports section; |
| 7 | Show Markus column in Sports section; |
| 8 | Show Ostler column in Sports section; |
| 9 | Show Powell column in Sports section; |
| 10 | Show Ratto column in Sports section; |
| 11 | Show Rosenthal column in Sports section; |
| 12 | Show Ventre column in Sports section; |
| 13 | Show Family Room in Living section; |
| 14 | Show Travel Detective column in Living section; |
| 15 | Show Music Reviews in Living section; |
| 16 | Show Hollywood Voyeur in Living section; |
| 17 | Show Stylin' in Living section; |
| 18 | Show Feast on This in Living section; |
| 19 | Show Laughing out load in Living section; |
| 20 | Show Bibliofile in Living section; |
| 21 | Show Connell column in Opinions section; |
| 22 | Show Alterman column in Opinions section; |
| 23 | Show Fund column in Opinions section; |
| 24 | Show Goldsborough column in Opinions section; |
| 25 | Show Grossman column in Opinions section; |
| 26 | Show Liu column in Opinions section; |
| 27 | Show Murdock column in Opinions section; |
| 28 | Show O'Donnell column in Opinions section; |
| 29 | Show Stengel column in Opinions section; and |
| 30 | NEWSSLATE-Show link to Slate in Opinions section. |

At step 220, Individual preference bits are set. The Individual bits also contain a compressed array of Boolean values, encoded like the Fast bits field. The bits in this field relate to news clipping categories. In the FIG. 4 and FIG. 5 embodiments, these categories are supplied by a third party to illustrate the ability to seamlessly integrate the invention with third-party data resources. The categories are stored in a UPD property (record) in a database on the server. Presently, there are UPD properties IND1 through IND22, corresponding to:

| Category | Value/Meaning |
|---|---|
| IND1 | Computer hardware |
| IND2 | Semiconductors |
| IND3 | Interactive media |
| IND4 | Telecommunications |
| IND5 | Networking |
| IND6 | Mass media |
| IND7 | Energy |
| IND8 | Insurance |
| IND9 | Business news |
| IND10 | Personal investing |
| IND11 | Health care |
| IND12 | Pharmaceuticals |
| IND13 | Automotive |
| IND14 | Weather & disasters |
| IND15 | Travel |
| IND16 | Celebrities |
| IND17 | Television |
| IND18 | Movies & videos |
| IND19 | Interactive entertainment |
| IND20 | Music |
| IND21 | WeirdNuz |
| IND22 | Health |

However, it is understood that these are exemplary categories and other categories may be represented in such a compressed format.

At step 222, On Air bits are set. The On Air bits contain a compressed array of Boolean values, encoded in the same way as the Fast bits field. The bits in this field correspond to on air programs (programs being aired on television/cable systems). Note the absence of OASCHED3. OASCHED3 corresponds to a program that has been canceled, or otherwise relocated to another position within the bit field. (One might re-order the program list, for compression/truncation purposes.) As with other missing values, lack of a definition corresponds to a default 0/empty value.

As with the news clipping categories, the on air programs are stored in the UPD property of the server-side database. When a client completes a personalization process, and selects such some or all of the programs, matching entries in the server-side database are then added to the dynamically generated cover/entry page to a web site (this can be applied to any generated web page). Typically a retrieved database entry specifies the time and date of the next instance of the program, along with information about topics to be covered, or guests to be interviewed. However, other data, such as reviews or commentary regarding the program, or cross-references between the program and other programs or Internet resources, may also be supplied to the client.

Presently, there are UPD properties OASCHED1 through OASCHED28, corresponding to:

| Category | Value/Meaning |
|---|---|
| OASCHED1 | Imus on MSNBC |
| OASCHED2 | Morning Line |
| OASCHED4 | NBC News Today in America |
| OASCHED5 | Newsfront |
| OASCHED6 | NBC News @Issue |
| OASCHED8 | News Chat |
| OASCHED10 | InterNight |
| OASCHED11 | The Big Show with Keith Olbermann |
| OASCHED12 | The News with Brian Williams |
| OASCHED13 | Time & Again |
| OASCHED15 | Morning Blend |
| OASCHED17 | NBC News at Sunrise |
| OASCHED18 | Today |
| OASCHED19 | NBC Nightly News with Tom Brokaw |
| OASCHED20 | Dateline NBC |
| OASCHED21 | Meet the Press |
| OASCHED22 | Nightside |
| OASCHED23 | Today's Guests |
| OASCHED24 | Squawk Box |
| OASCHED25 | Power Lunch |
| OASCHED26 | CNBC's Hardball with Chris Matthews |
| OASCHED27 | CNBC's Rivera Live! |
| OASCHED28 | CNBC's Equal Time |

At step 224, MLB, NFL, NHL, and NBA bits are set. Preferably broken into separate fields, each field governs the generation of a scoreboard on a personalized page. Each field is either empty to indicate that no scores should be displayed, or containing an asterisk ("*") to indicate that all scores should be displayed, or containing a compressed array of Boolean values specifying which team scores should be displayed. As noted above, the client is presented with an interface to select preferences. Thus, for this field, an HTTP form can be generated with a series of check boxes, allowing the client to indicate what information is to be tracked. An all-inclusive option may be presented to indicate tracking all ("*") options.

When generating a dynamic page, team inclusion is tested on the serer. The league bit arrays are expanded, where as discussed above, a single bit of each bit of each field corresponds to a particular team. So, for example, the first bit of the NFL field can correspond to Boston, the second bit to Buffalo, the third to Calgary, etc. For each selected team, the dynamically generated page will present news or game information related to the team. In addition, the server may also cross-reference information. So, if a client only requests information concerning Calgary, but Calgary happens to be playing against Boston, then the server can include information about the Boston-Calgary game. Similarly, any other Boston-related information that might be of interest to a Calgary fan, such as a player-trade, can also be presented to the client.

Note that in a preferred embodiment, personalization is effected through a graphical user interface (such as a web-page) that allows a client to directly navigate to different personalization interests. Thus, it is not required for a user to navigate the steps of FIG. 5 strictly in the order shown. If the client jumps to a particular personalization step, and then saves and exits from personalization, then the remaining personalization options have blank/empty values, and will be interpreted according to the default values for the missing information. It is also understood that the ordering of the steps of FIG. 5 is for example only, and that a different ordering may be imposed by a web page developer. Software code used in an exemplary embodiment is attached as Appendix A.

Thus, according to the teachings of FIG. 5, the contents of the FIG. 4 cookie corresponds a client having made the following personalization elections:

| | |
|---|---|
| First name | John; |
| Last name | Smith; |
| News | US News Business; |
| Stocks | MSFT and AMZN; |
| Sports | "All Games" for all five leagues (a different arrangement of teams or categories may be provided); |
| Local news | KING, which is the FCC identifier for a Seattle, WA news source (identifiers may be utilized); |
| Technology | All four available sections are selected, but no featured stories are requested; |
| Living | No selection; |
| On Air | All but "Equal Time" are selected |
| Opinions | All options have been selected |
| Weather | Seattle, WA weather has been selected, with a request that a four day forecast be added to the main entry page of the server's web site; |
| Personal topics | Microsoft, and in Individual: computer hardware, Interactive media, and WierdNuz |

Figure 6:
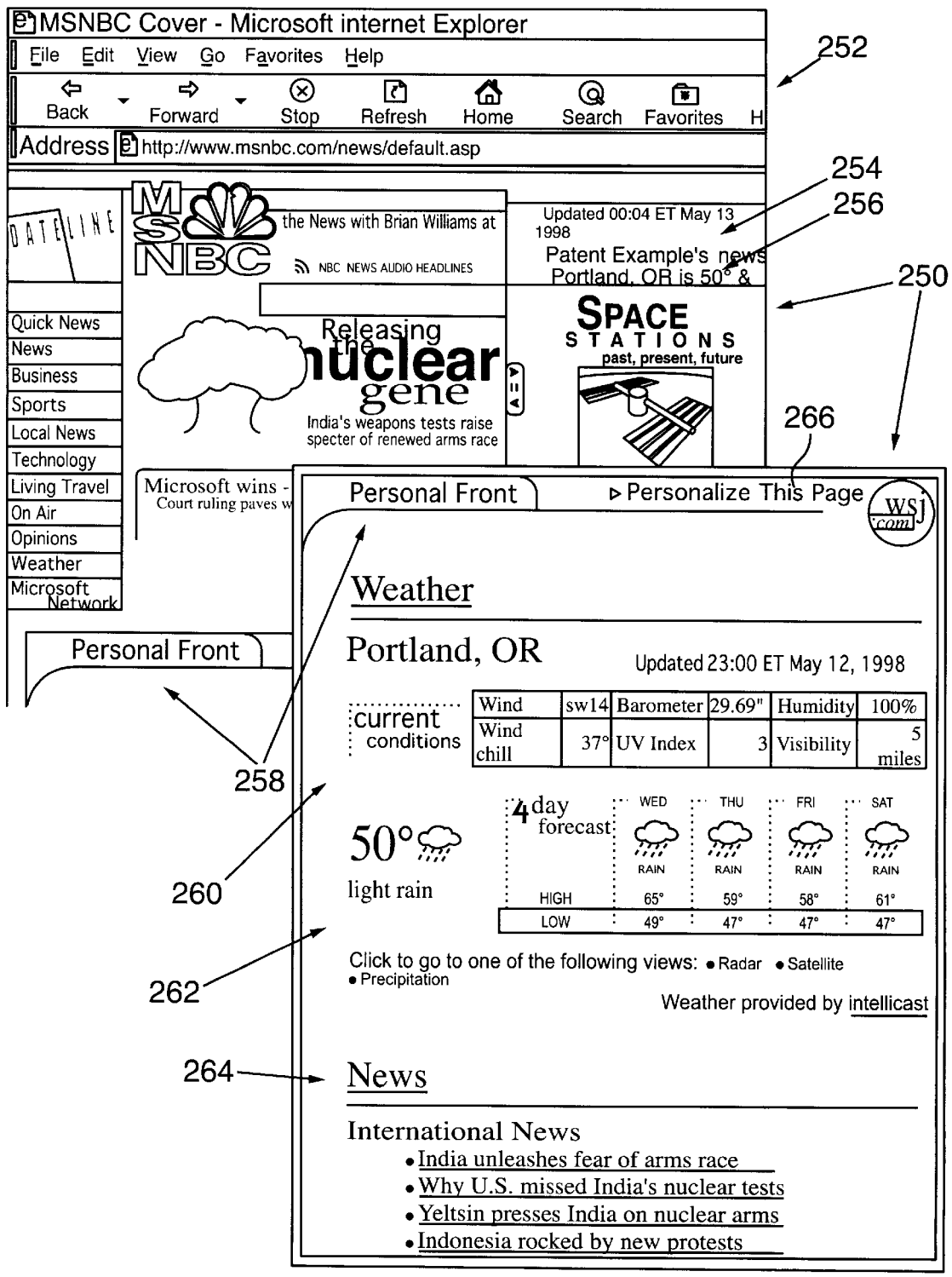
FIG. 6 shows a first exemplary personalized entry-page.

FIG. 6 shows a first exemplary personalized entry-page 250. Since web pages do not have a fixed page size, shown is two sections of the same page. At the top of the page 250 is a header section 252 common to all pages. Although not required, it is expected a common header will be provided at the top of an entry page, and customized page data will follow, or be intermixed with other default page content. If personalization has been performed, preferably the header will be modified to contain some personalization information, such as the client's name 254 (note use of proper possessive form, which was computed once during personalization), or an active marquee 256 (e.g. content can cycle over time) highlighting personalization data.

After the general header 252, a banner heading 258 such as "Personal Front" is used to demark the start of personalized web page data. In this particular example, the client requested that the personalized page include current weather 260, a four-day weather forecast 262, and international news 264 headings.

Also shown as item 266 is a personalization button. Selecting this button (it is understood that references to a button includes other activation methods as well, including image hot-spots, hypertext-links, etc.) initiates the personalization routines, and allows one to create or revise personalization settings in accord with the teachings of FIG. 5.

FIG. 7 shows a second exemplary personalized page. This second example was generated by selecting the personalization button 266 of FIG. 6. Selecting the button causes a preferences-selection box to be displayed, in which both linear and direct-access navigation methods are provided. In the linear method, the steps of FIG. 5 are presented in order, allowing the client to review all personalization options. In the direct-access method, a table of personalization buttons are presented for directly jumping to a personalization page for each available option category (e.g., weather, stocks, local new, international news, etc.).

As with FIG. 6, after the general header 252, the Personal Front banner demarks the start of personalized web page data. In this particular example, during the re-personalization process, the client has changed the weather personalization to display weather 270 and four-day forecast 272 for Seattle, Wash. instead of Portland, Oreg. And, instead of displaying international news, the client has elected to instead receive domestic news coverage 274.

From the foregoing, it will be recognized that the illustrated embodiment of the present invention minimizes communication between the web browser and server, while speeding generation and presentation of user-customized web pages.

Having described and illustrated the principles of my invention with reference to an illustrated embodiment, it will be recognized that the illustrated embodiment can be modified in arrangement and detail without departing from such principles. Accordingly, I claim as my invention all such modifications as may come within the scope and spirit of the following claims and equivalents thereto.

Appendix A

Exemplary Implementation Code

Copyright © 1998 Microsoft Corporation

```
5       ' Code to create a cookie based on user's information in the property database
        Function StrPxFromPropertyDatabase(upd)
        Dim strPx, strVersion, str, iupd, strList, abln(60), blnKeywords, lbln
            If IsNull(upd) Then
                Set upd = Server.CreateObject("MPS.PropertyDatabase")
10              If Not IsObject(upd) Then
                    StrPxFromPropertyDatabase = ""
                    Exit Function
                End If
            End If
15      If upd("visittimes") = "" Then strPx = "0"
        Else
            ' Version added at end
            strVersion = "05!"
            ' Minipers user name
20          str = StrWithoutBangs(upd("covername"))
            If str <> "" Then
                If Right(str, 1) <> "s" Then str = str & "'s"
                Else
                    str = str & "'" End If End If strPx = strPx & str & "!"
25          ' Weather city
            strPx = strPx & upd("wcity") & "!"
            ' Fast bits
            abln(1) = upd("lw")                             <> ""
            abln(2) = upd("anynews")                        <> ""
30          abln(3) = upd("anycom")                         <> ""
            abln(4) = upd("anyspt")                         <> ""
            abln(5) = upd("newslocal") & upd("traffic")     <> ""
            abln(6) = upd("anytech")                        <> ""
            abln(7) = upd("anyliv")                         <> ""
35          abln(8) = upd("anyop")                          <> ""
            abln(9) = upd("newschat")                       <> ""
            abln(10) = upd("anyoa")                         <> ""
            abln(11) = blnKeywords Or upd("anyind")         <> ""
            abln(12) = upd("newsint")                       <> ""
40          abln(13) = upd("newsus")                        <> ""
            str = upd("wldcom")
            abln(14) = Instr(str, "meeks")                  <> 0
            abln(15) = Instr(str, "moran")                  <> 0
            str = upd("comcom")
```

```
abln(16) = Instr(str, "bowermaster")        <> 0
abln(17) = Instr(str, "byron")              <> 0
abln(18) = Instr(str, "crockett")           <> 0
abln(19) = Instr(str, "huus")               <> 0
abln(20) = Instr(str, "thomas")             <> 0
abln(21) = Instr(str, "weaver")             <> 0
abln(22) = upd("newslocal")                 <> ""
abln(23) = upd("techint")                   <> ""
abln(24) = upd("techpol")                   <> ""
abln(25) = upd("techttt")                   <> ""
abln(26) = upd("techcrime")                 <> ""
abln(27) = upd("menshlth")                  <> ""
abln(28) = upd("womenshlth")                <> ""
abln(29) = upd("newsfilm")                  <> ""
abln(30) = upd("newsceleb")                 <> ""
strPx = strPx & StrFromAbln(abln, 30) & "!"
' Numeric
strList = ""
Select Case upd("traffic")
    Case "Atlanta"               str = "1"
    Case "Boston"                str = "2"
    Case "Chicago"               str = "3"
    Case "Cincinnati"            str = "4"
    Case "Houston"               str = "5"
    Case "Los Angeles"           str = "6"
    Case "Minneapolis/St. Paul"  str = "7"
    Case "Paris, France"         str = "8"
    Case "Philadelphia"          str = "9"
    Case "Phoenix"               str = ":"
    Case "Pittsburgh"            str = ";"
    Case "San Antonio"           str = "<"
    Case "San Diego"             str = "="
    Case "Seattle"               str = ">"
    Case "Washington, D.C."      str = "?"
    Case Else                    str = "0"
End Select
strList = str
Select Case upd("astrosign")
    Case "Aries"                 str = "1"
    Case "Taurus"                str = "2"
    Case "Gemini"                str = "3"
    Case "Cancer"                str = "4"
    Case "Leo"                   str = "5"
    Case "Virgo"                 str = "6"
    Case "Libra"                 str = "7"
    Case "Scorpio"               str = "8"
```

```
                Case "Sagittarius"      str = "9"
                Case "Capricorn"        str = ":"
                Case "Aquarius"         str = ";"
                Case "Pisces"           str = "<"
 5              Case Else               str = "0"
            End Select
            strList = strList & str
            strPx = strPx & StrElide(strList, "0") & "!"
            ' Affiliate
10          If upd("newslocal") = "on" Then str = upd("affiliate")
            Else
                str = "" End If strPx = strPx & str & "!"
            ' Stocks
            strList = ""
15          For iupd = 1 To 12
                str = StrWithoutBangs(upd("sq" & iupd))
                If str <> "" Then strList = strList & "," & str
                End If
            Next
20          If upd("dow") <> "" Then strList = strList & ",$INDUA"
            End If
            If upd("sp500") <> "" Then strList = strList & ",SPX"
            End If
            If upd("nasdaq") <> "" Then strList = strList & ",COMP"
25          End If
            If upd("amex") <> "" Then strList = strList & ",XAX"
            End If
            If upd("rus2000") <> "" Then strList = strList & ",RUT"
            End If
30          If strList <> "" Then strList = Mid(strList, 2)
            End If
            strPx = strPx & strList & "!"
            ' Keywords
            strList = ""
35          For iupd = 1 To 6
                str = StrWithoutBangs(upd("kw" & iupd))
                If str <> "" Then strList = strList & "," & str
                End If
            Next
40          If strList <> "" Then
                strList = Mid(strList, 2)
                blnKeywords = True
            End If
            strPx = strPx & strList & "!"
45          ' More bits
            str = upd("sportcom")
```

```
abln(1) = Instr(str, "borges")        <> 0
abln(2) = Instr(str, "gargano")       <> 0
abln(3) = Instr(str, "hyde")          <> 0
abln(4) = Instr(str, "ingram")        <> 0
abln(5) = Instr(str, "kravitz")       <> 0
abln(6) = Instr(str, "lupica")        <> 0
abln(7) = Instr(str, "markus")        <> 0
abln(8) = Instr(str, "ostler")        <> 0
abln(9) = Instr(str, "powell")        <> 0
abln(10) = Instr(str, "ratto")        <> 0
abln(11) = Instr(str, "rosenthal")    <> 0
abln(12) = Instr(str, "ventre")       <> 0
str = upd("lifcom")
abln(13) = upd("newsfamily")          <> ""
abln(14) = Instr(str, "greenberg")    <> 0
abln(15) = upd("newsmusic")           <> ""
abln(16) = Instr(str, "rubin")        <> 0
abln(17) = upd("newsstyle")           <> ""
abln(18) = upd("newsfood")            <> ""
abln(19) = upd("newshumor")           <> ""
abln(20) = upd("newsbook")            <> ""
str = upd("opcom")
abln(21) = Instr(str, "connell")      <> 0
abln(22) = Instr(str, "alterman")     <> 0
abln(23) = Instr(str, "fund")         <> 0
abln(24) = Instr(str, "goldsborough") <> 0
abln(25) = Instr(str, "grossman")     <> 0
abln(26) = Instr(str, "liu")          <> 0
abln(27) = Instr(str, "murdock")      <> 0
abln(28) = Instr(str, "donnell")      <> 0
abln(29) = Instr(str, "stengel")      <> 0
abln(30) = upd("newsslate")           <> ""
strPx = strPx & StrFromAbln(abln, 30) & "!"
' Individual bits
For ibln = 1 To 22 abln(ibln) = upd("ind" & ibln) <> ""
Next
strPx = strPx & StrFromAbln(abln, 22) & "!"
' On Air bits
For ibln = 1 To 28 abln(ibln) = upd("oasched" & ibln) <> ""
Next
strPx = strPx & StrFromAbln(abln, 28) & "!"
' MLB bits
str = upd("ss1")
If str = "some" Then
    str = " " & upd("ss1t") & ","
    For ibln = 1 To 28 abln(ibln) = Instr(str, " " & ibln & ",") <> 0
```

```
                    Next
                    strList = StrFromAbln(abln, 28)
                Elself str = "on" Then
                    strList = "*"
 5              Else strList = "" End If strPx = strPx & strList & "!"
            ' NFL bits
            str = upd("ss4")
            If str = "some" Then
                str = " " & upd("ss4t") & ","
10              For ibln = 1 To 33 abln(ibln) = Instr(str, " " & ibln & ",") <> 0
                Next
                strList = StrFromAbln(abln, 33)
            Elself str = "on" Then strList = "*"
                Else strList = "" End If strPx = strPx & strList & "!"
15          ' NHL bits
            str = upd("ss2")
            If str = "some" Then
                str = upd("ss2t")
20              abln(1)  = Instr(str, "'Boston'")       <> 0
                abln(2)  = Instr(str, "'Buffalo'")      <> 0
                abln(3)  = Instr(str, "'Calgary'")      <> 0
                abln(4)  = Instr(str, "'Chicago'")      <> 0
                abln(5)  = Instr(str, "'Detroit'")      <> 0
                abln(6)  = Instr(str, "'Edmonton'")     <> 0
25              abln(7)  = Instr(str, "'Carolina'")     <> 0
                abln(8)  = Instr(str, "'Los Angeles'")  <> 0
                abln(9)  = Instr(str, "'Dallas'")       <> 0
                abln(10) = Instr(str, "'Montreal'")     <> 0
                abln(11) = Instr(str, "'New Jersey'")   <> 0
30              abln(12) = Instr(str, "'N.Y. Islanders'") <> 0
                abln(13) = Instr(str, "'N.Y. Rangers'") <> 0
                abln(14) = Instr(str, "'Ottawa'")       <> 0
                abln(15) = Instr(str, "'Philadelphia'") <> 0
                abln(16) = Instr(str, "'Pittsburgh'")   <> 0
35              abln(17) = Instr(str, "'Colorado'")     <> 0
                abln(18) = Instr(str, "'San Jose'")     <> 0
                abln(19) = Instr(str, "'St. Louis'")    <> 0
                abln(20) = Instr(str, "'Tampa Bay'")    <> 0
                abln(21) = Instr(str, "'Toronto'")      <> 0
40              abln(22) = Instr(str, "'Vancouver'")    <> 0
                abln(23) = Instr(str, "'Washington'")   <> 0
                abln(24) = Instr(str, "'Phoenix'")      <> 0
                abln(25) = Instr(str, "'Anaheim'")      <> 0
                abln(26) = Instr(str, "'Florida'")      <> 0
45              strList = StrFromAbln(abln, 26)
            Elself str = "on" Then strList = "*"
```

```
            Else strList = ""
        End
    If strPx = strPx & strList & "!"
    ' NBA bits
    str = upd("ss5")
    If str = "some" Then
        str = " " & upd("ss5t") & ","
        For ibln = 1 To 29 abln(ibln) = Instr(str, " " & ibln & ",") <> 0
        Next
        strList = StrFromAbln(abln, 29)
    ElseIf str = "on" Then strList = "*"
        Else strList = "" End
    If strPx = strPx & strList & "!"
    ' MLS bits
    str = upd("ss7")
    If str = "some" Then
        str = upd("ss7t")
        abln(1) = Instr(str, "'Chicago'")        <> 0
        abln(2) = Instr(str, "'Colorado'")       <> 0
        abln(3) = Instr(str, "'Columbus'")       <> 0
        abln(4) = Instr(str, "'Dallas'")         <> 0
        abln(5) = Instr(str, "'D.C. United'")    <> 0
        abln(6) = Instr(str, "'Kansas City'")    <> 0
        abln(7) = Instr(str, "'Los Angeles'")    <> 0
        abln(8) = Instr(str, "'Miami'")          <> 0
        abln(9) = Instr(str, "'New England'")    <> 0
        abln(10) = Instr(str, "'N.Y.-N.J.'")     <> 0
        abln(11) = Instr(str, "'San Jose'")      <> 0
        abln(12) = Instr(str, "'Tampa Bay'")     <> 0
        strList = StrFromAbln(abln, 12)
    ElseIf str = "on" Then strList = "*"
        Else strList = "" End If strPx = strPx & strList & "!"
    ' Truncate extra data
    strPx = StrElide(strPx, "!")
    If StrPx <> "" Then strPx = strVersion & strPx
    Else strPx = "0"
    End If
End If
' Set cookie
If Instr(1,Request.ServerVariables("SERVER_NAME"),"msnbc.com",1) 0 Then
    Response.Cookies("PX").Domain = ".msnbc.com"
End If
Response.Cookies("PX").Path = "/news/"
Response.Cookies("PX").Expires = DateAdd("yyyy", 1, date())
Response.Cookies("PX") = strPx
```

```
        StrPxFromPropertyDatabase = strPx
    End Function
    ' Filters out exclamation points from strings
    Function StrWithoutBangs(str)
5       Dim ichr
        ichr = Instr(str, "!")
        While ichr > 0
            str = Left(str, ichr - 1) & Mid(str, ichr + 1) ichr = Instr(str, "!")
        Wend
10      StrWithoutBangs = str
    End Function ' Generates a string containing the compressed version of a bit array Function
    StrFromAbln(abln, cbln)
15      Dim ibln, bit, intBits, str
        bit = 1
        For ibln = 1 To cbln
            If abln(ibln) Then intBits = intBits + bit
            End If
20          If bit = 32 Or ibln = cbln Then
                str = str + Chr(intBits + 48)
                bit = 1
                intBits = 0
            Else bit = bit + bit
25          End If
        Next
        StrFromAbln = StrElide(str, "0")
    End Function 30  ' Truncates extra '0' characters from bit arrays, or '!' separators from the overall cookie,
    Function StrElide(str, strToElide)
        Dim cchr
        cchr = Len(str)
        Do While cchr <> 0 And Right(str, 1) = strToElide
35          cchr = cchr - 1
            str = Left(str, cchr)
        Loop
        StrElide = str
    End Function
40  Code that uses the cookies ' Fills in a bit array based on the compressed string
    Sub AblnFromStr(str, abln, cbln)
        On Error Resume Next
45      Dim ibln, ichr, ibit, intBits
        ichr = 0
```

```
            ibit = 64
            str = str & String((cbln + 5) \ 6, 48)
            For ibln = 1 to cbln
                If ibit = 64 Then
 5                  ibit = 1
                    ichr = ichr + 1
                    intBits = Asc(Mid(str, ichr)) - 48
                End If
                abln(ibln) = ((intBits And ibit) <> 0)
10              ibit = ibit + ibit
            Next
        End Sub ' Removes a !-delimited string from the beginning of the cookie Function
15      StrThroughBang(ByRef strSource)
            On Error Resume Next
            Dim ichrBang
            ichrBang = Instr(strSource, "!")
            If ichrBang <> 0 Then
20              StrThroughBang = Left(strSource, ichrBang - 1) strSource = Mid(strSource, ichrBang + 1)
            Else
                StrThroughBang = strSource
                strSource = ""
25          End If
        End Function ' Decodes an N+48 encoded number, and uses that as an index into a bit-array,
        returning the corresponding value.
30      Function BlnFromAblnStr(abln, str)
            BlnFromAblnStr = abln(Asc(str) - 48)
        End Function ' Below code excerpts that use the cookie for front page generation
35          strVersion = StrThroughBang(strPX)
            strUser = StrThroughBang(strPX)
            strFaa = StrThroughBang(strPX)
            [...]
            strFast = StrThroughBang(strPX)
40          strNum = StrThroughBang(strPX)
            strFcc = StrThroughBang(strPX)
            strStocks = StrThroughBang(strPX)
            strKeywords = StrThroughBang(strPX)
            strMore = StrThroughBang(strPX)
45          strIndividual = StrThroughBang(strPX)
            strOnAir = StrThroughBang(strPX)
```

```
           strMlb = StrThroughBang(strPX)
           strNfl = StrThroughBang(strPX)
           strNhl = StrThroughBang(strPX)
           strNba = StrThroughBang(strPX)
 5         strMls = StrThroughBang(strPX)
           If strFast <> "" Then AbInFromStr strFast, abInFast, 30
           End If
           If strMore <> "" Then AbInFromStr strMore, abInMore, 30
           End If
10         [...]
           If abInFast(1) Then
               PfpWeather
           End If
           [...]
15         If (strMlb & strNfl & strNhl & strNba & strMls <> "") Then %><FONT SIZE=4><A
           HREF="/modules/sports/scoreboard/default.asp">Today's
           Scoreboard</A></TD></TR><TR ALIGN=INTER><TD COLSPAN=2><%
               If strNba <> "" Then PfpSportsScores "NBA", "pfp.nba", strNba
               End If
20             If strNhl <> "" Then PfpSportsScores "NHL", "pfp.nhl", strNhl
               End If
           End If
           [...]

25     ' This sub pulls sports scores out of the sports cache. The "Application" object is the
       cache, which is used to store string and numeric data. For sports scores, the IDs of the
       two teams involved in a game are encoded as N+48 numbers, and we have a bit array
       of the teams the user is interested in from the cookie. We walk through the list of
       games, using BInFromAbInStr to determine if the user has registered interest in a team
30     associated with a game.
       Sub PfpSportsScores(strLeague, strPrefix, strAbIn)
           Dim cstrAll, bInAll, cstr, istr, strTeams, abIn(40), abInWrite(40),
       ichr, cstrHalf
           cstrAll = Application(strPrefix & ".count")
35         bInAll = (strAbIn = "*")

If cstrAll = "" Then
               Response.Write "<FONT SIZE=3 COLOR=#000000>" & strLeague & "
       scores are not available at this time.</FONT><P>"
40             Exit Sub
           End If
           ' Check if the user's preferences match any of the team scores in
       the cache
           If bInAll Then cstr = cstrAll
45         Else
               AbInFromStr strAbIn, abIn, 40 strTeams = Application(strPrefix & ".teams")
```

```
             cstr = 0
             For ichr = 1 To Len(strTeams) Step 2
                 If BlnFromAbInStr(abIn, Mid(strTeams, ichr, 1)) Or
             BlnFromAbInStr(abIn, Mid(strTeams, ichr + 1, 1)) Then
 5                   cstr = cstr + 1
                     abInWrite((ichr \ 2) + 1) = True
                 End If
             Next
         End If
10       cstrHalf = (cstr + 1) \ 2

If cstr > 0 Then
             Response.Write "<TABLE WIDTH85><TR><TD WIDTH 0
         VALIGN=TOP HEIGHT ></TD><TD WIDTH=5></TD><TD WIDTH 0 VALIGN=TOP
15       HEIGHT ></TD></TR><TR><TD COLSPAN=2 VALIGN=TOP><FONT SIZE=4
         COLOR=#003399>" & strLeague & "</FONT><FONT FACE=Arial SIZE=1
         COLOR=#000000>    for " & Application(strPrefix & ".date") &
         "</FONT></TD><TD ALIGN=RIGHT><FONT SIZE=4> </FONT><FONT
         FACE=Arial
20       SIZE=1 COLOR=#000000>Times are in U.S. Eastern
         Time</FONT></TD></TR><TR><TD
         COLSPAN=3 VALIGN=MIDDLE HEIGHT=2><HR NOSHADE
         SIZE=1></TD></TR><TR><TD
         VALIGN=TOP><TABLE CELLSPACING=1 CELLPADDING=0>"
25           cstr = 0
             For istr = 1 To cstrAll
                 If blnAll Or abInWrite(istr) Then
                     Response.Write Application(strPrefix & ".array." & istr)
                     cstr = cstr + 1
30                   If cstr = cstrHalf Then
                         %></TABLE></TD><TD></TD><TD
         VALIGN=TOP><TABLE CELLSPACING=1 CELLPADDING=0><%
                     End If
                 End If
35           Next
             %></TABLE></TD></TR></TABLE><%
         End If
         Debug_Split "Sports " & strLeague
         End Sub
```

What is claimed is:

1. A method of serving customized web pages using a data structure, the data structure containing information indicating a set of web page content preferences of a user of a first computer, the data structure designed to be returned to a second computer by the first computer and the second computer thereby generating in response to receiving the data structure a customized web page based on the set of web page content preferences of the user, and the second computer returning the customized web page to the first computer, the data structure possibly containing canonical representations of user web page content preferences, where canonical representations of user web page content preferences are defined as ASCII character sequences containing key-value pairs, the data structure having at least a compressed representation of customized web page preferences, the compressed representation comprising non-canonical representations of customized web page preferences, the method comprising:

identifying by the second computer a character from the non-canonical representations and determining the binary representation of the character, the binary representation comprising an ordered string of bits;

determining whether each bit within the string of bits is set or not;

determining to include and exclude customized content from a customized web page based on a combination of the location of a bit within the binary representation of the character along with whether or not the bit in that location is set;

whereby the binary representation of preferences in the data structure reduces server latency in customized web page generation.

2. The method of claim 1, further comprising:

identifying by the second computer a version number from the data structure;

determining by the version number, a mapping of customized web page preferences to bit locations.

3. A method of minimizing server latency while constructing a personalized client web page according to a client's interests, the personalized web page defined by a set of client content choices contained within a data structure, the data structure possibly containing canonical representations of web page client content choices, where canonical representations of web page client content choices are defined as ASCII character sequences containing name-value pairs, the method comprising:

storing by a server in the data structure non-canonical compressed representations of client content choices;

delivering by the server to the client the data structure;

accepting by the server the data structure from the client;

identifying by the server a character within the non-canonical compressed representations of client content choices; and determining the binary representation of the character, the binary representation comprising an ordered string of personalized web page content exclusion and inclusion bits;

determining for each of plural bits in the ordered string of personalized web page content exclusion and inclusion bits, a client content choice based on a combination of the location of the bit within the binary representation of the character along with whether or not the bit in that location is set;

sending to the client the personalized web page containing plural content choices determined from the personalized web page content exclusion and inclusion bits.

4. The method of claim 3, further comprising identifying by the server within the data structure an identification of a data structure version and the identification of the data structure version is used by the server to determine the format of the data structure contents.

5. A method of constructing a cookie data structure for storing a client's preferences, the data structure having plural fields, and each field having plural field entries, each such entry being a client preference exclusion and inclusion bit corresponding to a particular content preference and having a default value, the method comprising:

ordering the plural fields such that preferences likely to have default values are last stored in the plural fields;

determining client content preferences; and storing such preferences in the cookie data structure;

wherein each field is truncated to remove trailing default values.

6. The method of claim 5 wherein the data structure further containing an identification of a data structure version number usable by the second computer to determine the structure of the data structure.

7. A computer readable medium comprising instructions that upon executing on a client computer make the client computer operational to accept a data structure from a server computer from over a network and to return the data structure to the server computer, the data structure used by the server computer to generate a customized web page for the client, the data structure comprising:

plural characters;

each character containing customized web page content exclusion and inclusion preference bits, a bit in the sequence indicating to the server by its position and value whether to include or exclude customized content in the customized web page.

8. The computer readable medium of claim 7 wherein the data structure further comprises:

a version number indicating a mapping of bit sequences to one of plural sets of customized web page content exclusion and inclusion preference sequences.

* * * * *